(12) United States Patent
Armstrong

(10) Patent No.: US 10,122,309 B2
(45) Date of Patent: Nov. 6, 2018

(54) GENERATOR COMPRISING A VARIABLE SPEED MAGNETIC GEAR

(71) Applicant: JAGUAR LAND ROVER LIMITED, Warwickshire (GB)

(72) Inventor: Alan Armstrong, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 388 days.

(21) Appl. No.: 15/106,855

(22) PCT Filed: Jan. 23, 2015

(86) PCT No.: PCT/EP2015/051330
§ 371 (c)(1),
(2) Date: Jun. 21, 2016

(87) PCT Pub. No.: WO2015/110569
PCT Pub. Date: Jul. 30, 2015

(65) Prior Publication Data
US 2017/0025977 A1    Jan. 26, 2017

(30) Foreign Application Priority Data
Jan. 23, 2014 (GB) .................................. 1401164.7

(51) Int. Cl.
*H02K 49/00* (2006.01)
*H02P 9/06* (2006.01)
(Continued)

(52) U.S. Cl.
CPC .................. *H02P 9/06* (2013.01); *B60L 1/00* (2013.01); *H02K 7/11* (2013.01); *H02K 7/1815* (2013.01);
(Continued)

(58) Field of Classification Search
CPC ...... H02K 49/00; H02K 7/1815; H02K 16/02; H02K 49/102; H02P 9/06
(Continued)

(56) References Cited

U.S. PATENT DOCUMENTS

| 8,653,677 B2 * | 2/2014 | West | F02B 37/00 |
| | | | 290/1 C |
| 8,733,480 B2 * | 5/2014 | Watanabe | B60K 6/36 |
| | | | 180/65.22 |

(Continued)

FOREIGN PATENT DOCUMENTS

| EP | 1353436 A2 | 10/2003 |
| EP | 2015429 A1 | 1/2009 |

(Continued)

OTHER PUBLICATIONS

Combined Search and Examination Report under Sections 17 and 18(3) for Application No. GB1401164.7 dated Aug. 29, 2014.

(Continued)

*Primary Examiner* — Hanh Nguyen
(74) *Attorney, Agent, or Firm* — Carlson, Gaskey & Olds

(57) ABSTRACT

A generator comprising a magnetic gear, the magnetic gear comprising a stationary member comprising a set of electromagnets, a first moveable member comprising a set of magnets, and a second moveable member disposed between the first moveable member and the stationary member. The second moveable member comprises a set of core members. The first and second moveable members are magnetically coupled to define a gear ratio therebetween and the electromagnets are operable to control the gear ratio. The stationary member comprises a stator of the generator and the first moveable member comprises an armature of the generator, wherein the armature is arranged to induce an electrical current in a set of generator windings disposed around the stator. The second moveable member comprises an input (Continued)

means arranged to receive a drive force. The gear ratio is variable, such that a variable output speed may be produced for a given input speed. In this way, the electrical output of the generator is decoupled from the input speed, so as to provide sufficient power for a range of input speeds.

20 Claims, 5 Drawing Sheets

(51) Int. Cl.
*H02K 7/11* (2006.01)
*H02K 16/00* (2006.01)
*B60L 1/00* (2006.01)
*H02K 7/18* (2006.01)
*H02K 16/02* (2006.01)
*H02K 49/10* (2006.01)
*H02K 7/00* (2006.01)

(52) U.S. Cl.
CPC ............ *H02K 16/00* (2013.01); *H02K 16/02* (2013.01); *H02K 49/102* (2013.01); *H02K 7/006* (2013.01)

(58) Field of Classification Search
USPC ........................................................ 310/103
See application file for complete search history.

(56) References Cited

U.S. PATENT DOCUMENTS

| 2007/0096574 | A1* | 5/2007 | Romagny | ................ | B60K 6/26 310/112 |
| 2008/0054748 | A1 | 3/2008 | Huber et al. | | |
| 2011/0042965 | A1* | 2/2011 | Atallah | .................... | H02K 7/11 290/1 C |
| 2011/0121672 | A1* | 5/2011 | Calverley | ................ | H02K 1/08 310/103 |
| 2011/0121673 | A1* | 5/2011 | Edwards | .................. | H02K 7/11 310/103 |
| 2011/0156518 | A1* | 6/2011 | Bright | .................. | H02K 19/106 310/103 |
| 2012/0098374 | A1 | 4/2012 | Curbelo et al. | | |
| 2013/0134815 | A1* | 5/2013 | Powell | ................. | H02K 7/1823 310/101 |
| 2013/0207391 | A1 | 8/2013 | Hemmelmann et al. | | |
| 2013/0234553 | A1 | 9/2013 | Kusase et al. | | |

FOREIGN PATENT DOCUMENTS

| EP | 2390994 A1 | 11/2011 |
| GB | 2488088 A | 8/2012 |
| WO | 2009/103994 A2 | 8/2009 |
| WO | 2011/061491 A2 | 5/2011 |
| WO | 2011/144895 A2 | 11/2011 |
| WO | 2013/016159 A2 | 1/2013 |

OTHER PUBLICATIONS

Combined Search and Examination Report under Sections 17 and 18(3) for Application No. GB1501114.1 dated Jul. 22, 2015.
International Search Report and Written Opinion of the International Searching Authority for International application No. PCT/EP2015/051330 dated Aug. 11, 2015.

* cited by examiner

GENERATOR COMPRISING A VARIABLE SPEED MAGNETIC GEAR

FIELD OF THE INVENTION

This disclosure relates to a generator comprising a variable speed magnetic gear. Aspects of the invention relate to a magnetic gear, a magnetic gear system, a generator, a generator system, a vehicle and a method for operating a magnetic gear.

BACKGROUND

As a result of recent changes in emissions regulations, there is widespread interest in reducing engine speeds in modern vehicles. In particular, it is desirable to reduce the idling speed of vehicle engines as far as possible, and also the engine speed at which automatic transmission systems select a higher gear, in order to comply with environmental legislation.

At the same time, the demand for electrical power in vehicles has been rising. This is in part due to the fact that modern vehicles typically include a large range of internal systems such as climate control, seat warming, infotainment systems, and so on. Often, the time when the electrical demand is highest coincides with a period of engine idling or low engine speed. For example, when a vehicle is first started and for a short time subsequently, the internal systems all initiate while the engine idles. Some systems, in particular heating, ventilation and air-conditioning (HVAC) systems, run at high power during this time in order to prepare the driving environment.

Although it is possible to use some stored battery power to meet the electrical demand, it is generally preferred to avoid depleting battery resources during normal running of the vehicle, to conserve battery power for start-up operations and avoid premature aging of the battery. It is therefore desirable to match the electrical generating capacity of the vehicle to the electrical load at all times.

Conventionally, electrical power is generated by an engine-driven alternator, and the generating capacity of the alternator is directly related to the speed at which the alternator is driven. Typically, an armature of the alternator is driven directly by the engine using an auxiliary drive belt. The drive belt is coupled to the engine and the armature using respective pulleys. The ratio of the pulleys is typically configured to provide a threefold increase in alternator speed relative to the engine speed.

Accordingly, in this arrangement the alternator speed is directly proportional to the engine speed. Therefore, if the pulley ratio is selected so as to provide sufficient generating capacity when the engine is idling, the alternator speed may be very high when the engine is running near a maximum speed. For example, if the armature must be rotated at 3000 rpm to serve the maximum electrical requirement of the vehicle, a 1000 rpm engine idling speed would satisfy this requirement with a 3:1 pulley ratio. Therefore, when the engine speed is near a maximum, typically 7000-9000 rpm, the alternator is spun at approximately 21000-27000 rpm. This is much faster than is necessary to satisfy the electrical power demand, which is wasteful. Furthermore, such high speed operation increases wear and potentially reduces the average time to component failure, and also necessitates robust bearings, which are expensive.

It is therefore desirable to reduce the maximum speed at which the alternator is driven, whilst ensuring the generating capacity remains sufficient during engine idling. One way to increase the generating capacity of the alternator is to increase the size of the armature, or even to add a second armature. These approaches allow the pulley ratio to be reduced, and therefore reduce the maximum speed of the alternator, while maintaining the required generating capabilities. However, this approach is not favoured, since raising the size of the armature goes against a general objective of reducing vehicle weight, in line with the overriding purpose of reducing emissions. Furthermore, in the case of a larger, heavier armature, more robust bearings would be required. For an arrangement including either a larger armature or multiple armatures, parasitic losses would increase due to increased friction.

An alternative approach has been proposed in which a mechanical gearbox is provided between the alternator and its respective pulley. In this arrangement, the gear has two selectable ratios, with an appropriate ratio being selected with respect to the instantaneous engine speed. A higher ratio can be selected at lower engine speeds to maximise generating capacity, and a lower ratio can be selected at higher engine speeds to reduce the drive speed of the alternator. Since two distinct gear ratios are provided, a drawback with this arrangement is that there is a changeover time whilst moving between the gears during which the alternator is not driven. Thus, during this time, generation drops significantly. A further consideration is that the mechanical gearbox introduces extra cost, weight, vibration/noise, complexity and failure potential, and there is currently a desire within the automotive industry to exchange mechanical systems for electrical systems where possible.

Another alternative approach has been proposed in which a variable speed magnetic gear, such as is described in US 2011/0037333 A1, is used in the place of a mechanical gearbox. A known variable speed magnetic gear includes three concentric and coaxial rotors. The innermost and outermost rotors each have a respective set of permanent magnets disposed evenly around their circumference. An intermediate rotor, which is disposed between the inner and outer rotors, comprises a set of core members. The core members are arranged to interact with the magnetic field between the two sets of magnets, such that movement of the intermediate member induces movement of the inner rotor. When the outer rotor is stationary, a fixed gear ratio is defined between the inner rotor and the intermediate rotor. Accordingly, an input shaft may be coupled to the intermediate rotor, and an output shaft may be coupled to the inner rotor, so as to provide a fixed speed increase between the input and the output shafts. In order to vary the gear ratio as required, so as to provide a variable speed increase, the outer rotor is physically rotated. This modulates or influences the coupling between the intermediate and inner rotors. An external means, for example a motor, must be provided for driving the outer rotor.

The combination of the magnetic gear with the external means for driving the outer rotor is complex, large and heavy. Therefore, this approach is unlikely to be preferable to simply increasing the size of the armature of the alternator.

Against this background, it would be desirable to provide a gear for use in an improved vehicle generating system, which overcomes or at least substantially alleviates the disadvantages known in the prior art.

SUMMARY OF THE INVENTION

According to an aspect of the invention there is provided a generator comprising a magnetic gear, the magnetic gear comprising a stationary member comprising a set of electromagnets; a first moveable member comprising a set of magnets; and a second moveable member disposed between the first moveable member and the stationary member, the second moveable member comprising a set of core members; wherein: the first and second moveable members are magnetically coupled to define a gear ratio therebetween; the electromagnets are operable to control the gear ratio; the stationary member comprises a stator of the generator; the first moveable member comprises an armature of the generator, the armature being arranged to induce an electrical current in a set of generator windings disposed around the stator; and the second moveable member comprises an input means arranged to receive a drive force.

Advantageously, in this arrangement the first movable member forms a common rotor to both the magnetic gear and the generator, removing the need for mechanical coupling of the gear and the generator. This provides a compact generator arrangement with a reduced part count relative to an arrangement in which a magnetic gear and a generator are provided separately. Additionally, the above-described aspect of the invention provides a variable gear ratio which may be controlled so as to decouple the output speed from the input speed. In this way, the magnetic gear can be used to provide an output speed range that is narrower than the input speed range. The electrical output of the generator is thus decoupled from, i.e. not directly proportional to the input speed, so as to provide sufficient power for a range of engine speeds.

This embodiment of the invention allows for rotation or other spatial modification of the first magnetic field, without the need to physically turn or move the stationary member which is optionally an outer member of the gear. Therefore, the gear ratio may be varied whilst the stationary member remains stationary, reducing the number of moving parts required. Further, the use of a common stationary member to the magnetic gear and to the generator provides a convenient packaging solution.

The stationary member may be arranged such that said set of generator windings are axially offset from the electromagnets of the magnetic gear.

The first movable member may have a first portion and a second portion. The first portion and the second portion may have different diameters. The first portion and the second portion may have different external diameters.

The first portion of the first movable member may be axially aligned with said set of electromagnets of the magnetic gear. The first portion of the first movable member may be larger in diameter than the second portion of the first movable member.

The stationary member may be arranged such that said set of generator windings are radially offset from the electromagnets of the magnetic gear. The generator windings may be disposed radially inward of the first movable member.

At least one magnet of the first moveable member may be arranged to cooperate with both the set of electromagnets and the set of generator windings.

The input means may comprise a pulley which is integrated with the second moveable member.

The stationary member may comprise a cylindrical bore. A portion of the second moveable member including the core members may be received in an end portion of the bore.

The set of electromagnets may be evenly distributed in a circular configuration around the bore. The set of generator windings may be evenly distributed in a circular configuration around the bore. The set of electromagnets may be disposed around the portion of the bore in which the core members are positioned. The set of generator windings may be disposed around a portion of the bore which is not occupied by the core members.

The second moveable member may include a recess which opens into the bore. An end portion of the first moveable member may be rotatably received in the recess. The first and second moveable members may be arranged concentrically with respect to the bore.

According to another aspect of the invention there is provided a generator system comprising a generator as previously described and a control means arranged to control operation of the electromagnets.

The control means may be arranged to provide an alternating current to the set of electromagnets such that the polarity of each electromagnet alternates, thereby to rotate the magnetic field relative to the stationary member at a speed determined by the frequency of the alternating current, thereby to control the gear ratio.

The control means may comprise a power inverter for providing the alternating current. The power inverter may be operable to control the frequency of the alternating current.

The generator system may comprise sensing means arranged to detect the rotational speed of at least one of the first and second moveable members. The control means may be arranged to control the gear ratio according to the detected speed of the first or second moveable member.

According to another aspect of the invention there is provided a vehicle comprising a generator as previously described.

According to another aspect of the invention there is provided a vehicle comprising a generator system as previously described.

The input means may be driven by an engine of the vehicle.

According to another aspect of the invention there is provided a method for operating the magnetic gear of the generator as previously described, comprising energising said set of electromagnets into a first state, so as to define an initial position for a magnetic field, and subsequently energising the set of electromagnets into a second state, so as to displace the magnetic field from its initial position.

The first state may define a respective initial polarity for each electromagnet. In the second state the polarity of each electromagnet may be opposite to its respective initial polarity.

The method may comprise energising the electromagnets such that each electromagnet alternates between the first and second states to define an alternation frequency.

The method may comprise adjusting the alternation frequency so as to adjust the gear ratio.

The method may comprise applying an alternating current to the electromagnets to alternate between the first and second states.

The method may comprise determining a rotational speed of an input to the gear. The gear ratio may be controlled in accordance with the rotational speed of the input so as to provide a desired output speed.

According to another aspect of the invention there is provided an apparatus comprising a stationary member comprising a set of electromagnets, a first moveable member comprising a set of magnets, and a second moveable member disposed between the first moveable member and the stationary member. The apparatus may take the form of a magnetic gear.

The second moveable member may comprise a set of core members arranged to modulate a magnetic field generated by the set of electromagnets. The first and second moveable members may be magnetically coupled to define a gear ratio therebetween, and the electromagnets are operable to influence the magnetic coupling between the first and second moveable members, thereby to control the gear ratio.

Advantageously, the above-mentioned aspect of the invention provides a variable gear ratio which may be controlled so as to decouple the output speed from the input speed. In this way, the magnetic gear can be used to provide an output speed range that is narrower than the input speed range. In contrast with the known magnetic gear arrangement described previously, this embodiment of the invention allows for rotation or other spatial modification of the first magnetic field, without the need to physically turn or move the stationary member which is optionally an outer member of the gear. Therefore, the gear ratio may be varied whilst the stationary member remains stationary, reducing the number of moving parts required. Accordingly, there is no requirement for an external or additional means for moving the stationary member of the arrangement of this embodiment, resulting in a simpler arrangement than was previously known in the art. Furthermore, having a stationary outer member is convenient in terms of packaging the magnetic gear.

The set of magnets of the first moveable member may be either permanent magnets or electromagnets. The core members may be made from a ferromagnetic material.

The first moveable member may couple to the modulated field, thereby to magnetically couple the first and second moveable members.

The set of electromagnets may be operable to rotate the magnetic field relative to the stationary member, so as to control the relative speed between the first and second moveable members and thereby control the gear ratio.

The second moveable member may be generally tubular. In one embodiment in which the second moveable member is generally tubular, the stationary member comprises a cylindrical bore in which the second moveable member is rotatably received, the first moveable member is rotatably received within the second moveable member, and the first and second moveable members are arranged concentrically with respect to the bore.

The set of electromagnets may be evenly distributed, e.g. equidistantly around the bore of the stationary member in a circular configuration. Similarly, the set of magnets may be evenly distributed around the first moveable member in a circular configuration, and the core members may be spaced from one another and evenly distributed around the second moveable member in a circular configuration.

The core members may be formed integrally with the second moveable member in a castellated arrangement.

The set of electromagnets may be arranged such that, when energised, each electromagnet of the set has an opposite polarity to an adjacent electromagnet of the set.

Each electromagnet of the set may be operable independently. This arrangement allows for electromagnets to be operated in pairs, triplets, and so on if desired, so as to vary the gear ratio.

The magnitude of the gear ratio may be determined, at least in part, by the ratio of the number of electromagnets associated with the stationary member to the number of magnets associated with the first movable member.

According to a further aspect of the invention, there is provided a method for operating a magnetic gear having a stationary member comprising a set of electromagnets as described above. The method comprises energising the set of electromagnets into a first state, so as to define an initial position for the magnetic field, and subsequently energising the set of electromagnets into a second state, so as to displace the magnetic field from its initial position. By displacing the magnetic field in this way, the effect may emulate a scenario in which the stationary member is physically rotated. Therefore, the gear ratio is varied without the need to physically move the stationary member.

The first state may define a respective initial polarity for each electromagnet, in which case, in the second state the polarity of each electromagnet is opposite to its respective initial polarity.

The method may comprise energising the electromagnets such that each electromagnet alternates between the first and second states to define an alternation frequency. The method may comprise adjusting the alternation frequency so as to adjust the gear ratio.

The method may comprise applying an alternating current to the electromagnets to alternate between the first and second states. Alternatively, alternating between the first and second states may be achieved by alternately switching electromagnets on and off.

The method may comprise determining a rotational speed of an input to the gear, and controlling the gear ratio in accordance with the rotational speed of the input so as to provide a desired output speed.

According to another aspect of the invention, there is provided a generator comprising a magnetic gear. The magnetic gear comprises a stationary member comprising a set of electromagnets, a first moveable member comprising a set of magnets, and a second moveable member disposed between the first moveable member and the stationary member. The second moveable member comprises a set of core members. The first and second moveable members are magnetically coupled to define a gear ratio therebetween, and the electromagnets are operable to control the gear ratio. The stationary member comprises a stator of the generator. The first moveable member comprises an armature of the generator, the armature being arranged to induce a current in a set of generator windings disposed around the stator, and the second moveable member comprises an input means arranged to receive a drive force.

The set of magnets may be either electromagnets or permanent magnets. The core members may be made from a ferromagnetic material.

The magnetic gear may comprise a set of core members arranged to modulate a magnetic field generated by the electromagnets, as described above.

This aspect of the invention provides a compact generator arrangement with a reduced part count relative to an arrangement in which a magnetic gear and a generator are provided separately. At the same time, the generator retains all of the advantages of the above described magnetic gear, in particular the ability to vary the gear ratio continuously. In this way, the electrical output of the generator is decoupled from, i.e. not directly proportional to the input speed, so as to provide sufficient power for a range of input speeds.

The generator may be arranged such that at least one magnet of the first moveable member is arranged to cooperate with both the set of electromagnets and the set of generator windings.

The input means may comprise a pulley which is integrated with the second moveable member.

The stationary member may comprise a cylindrical bore, in which case a portion of the second moveable member including the core members is received in an end portion of the bore.

In an embodiment, the set of electromagnets and the set of generator windings are evenly distributed in a circular configuration around the bore, with the set of electromagnets disposed around the portion of the bore in which the core members are positioned, and the set of generator windings disposed around a portion of the bore which is not occupied by the core members.

The second moveable member may include a recess which opens into the bore, and an end portion of the first moveable member may be rotatably received in the recess, such that the first and second moveable members are arranged concentrically with respect to the bore.

The bore may have a closed end including a central projection, in which case the first moveable member is rotatably mounted to the projection.

Such a generator can be used as a voltage converter when the engine is not running. Accordingly, in another aspect of the invention, there is provided a method for operating a generator as described above, the method comprising operating the electromagnets so as to induce rotation of the first moveable member, such that a current is generated in the generator windings. In this case, the second moveable member is held stationary by the engine.

This method of operation beneficially uses the generator as a power inverter to convert a high voltage DC supply into a low voltage AC output. Power electronics circuitry could be used to convert AC produced in the windings into a DC supply, so as to provide an overall DC/DC voltage conversion. This may find particular application in a hybrid or electric vehicle, in which a high voltage provided by the vehicle battery can be reduced to a suitable level for powering internal electrical systems of the vehicle.

According to another aspect of the invention, there is provided a magnetic gear system comprising a magnetic gear having a stationary member comprising a set of electromagnets as described above, and a control means arranged to control operation of the electromagnets.

The control means may be arranged to provide an alternating current to the set of electromagnets such that the polarity of each electromagnet alternates, thereby to rotate the magnetic field relative to the stationary member at a speed determined by the frequency of the alternating current, thereby to control the gear ratio.

The control means may comprise a power inverter for providing the alternating current, in which case the power inverter is operable to control the frequency of the alternating current.

The second moveable member may be coupled to an input shaft, and the magnetic gear system may comprise sensing means arranged to detect a rotational speed relating to the input shaft.

The first moveable member may be coupled to an output shaft, and the control means may be arranged to control the gear ratio according to the detected speed such that the output shaft rotates at a speed within a pre-determined range. The speed of the output shaft may be calculated from the frequency of the current induced in the windings of the stator coils.

According to another aspect of the invention, there is provided a generator system comprising a magnetic gear having a stationary member comprising a set of electromagnets as described above, and a control means arranged to control operation of the electromagnets.

The control means may be arranged to provide an alternating current to the set of electromagnets such that the polarity of each electromagnet alternates, thereby to rotate the magnetic field relative to the stationary member at a speed determined by the frequency of the alternating current, thereby to control the gear ratio.

The control means may comprise a power inverter for providing the alternating current, and the power inverter may be operable to control the frequency of the alternating current.

The generator may comprise sensing means arranged to detect the rotational speed of at least one of the first and second moveable members, in which case the control means may be arranged to control the gear ratio according to the detected speed of the input means or the first moveable member.

According to another aspect of the invention, there is provided a vehicle comprising a magnetic gear system according to the aforementioned aspect. When the magnetic gear system comprises an output shaft, the output shaft may be operably coupled to a vehicle generator, and the input shaft may be operably coupled to a vehicle engine. This embodiment solves the previously described problem in which the speed at which a vehicle generator is driven becomes too high at high engine speeds, because the magnetic gear is operable to reduce the gear ratio between the input and output shafts, thereby providing a narrower output speed range, with a lower maximum speed, relative to the input speed range.

According to another aspect of the invention, there is provided a vehicle comprising a generator as described above.

According to another aspect of the invention, there is provided a vehicle comprising a generator system as described above.

For either of the above described vehicles which include a generator as described previously, the input means may be driven by an engine of the vehicle.

According to yet another aspect of the invention, there is provided a controller-implemented method of setting a gear ratio of the generator described above so as to provide a desired output. The method comprises applying closed loop control using the frequency of an induced current in one or more of the generator windings as a feedback value (or process value) for the controller, either directly or by influencing an independent signal which acts as the feedback to the controller. The desired output, which is a set point value to the controller, can be any indicative signal such as the desired speed of the rotor, or the desired frequency at which electrical power is generated via electromagnetic induction. The output (or command value) from the controller can be any signal used to directly or indirectly vary an angular velocity of the magnetic field used to induce a gear ratio via the electromagnets within the stationary member.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

Embodiments of the present invention will now be described, by way of example only, with reference to the accompanying drawings, in which like components are assigned like numerals, and in which:—

DETAILED DESCRIPTION

Figure 1:
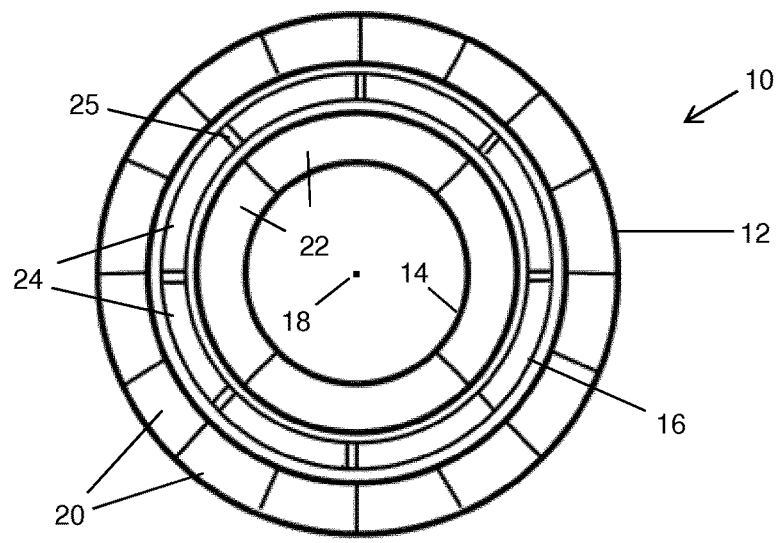
FIG. 1 is a schematic cross-sectional view of a magnetic gear according to an embodiment of the invention, taken normal to the rotation axis of the gear.
Figure 2:
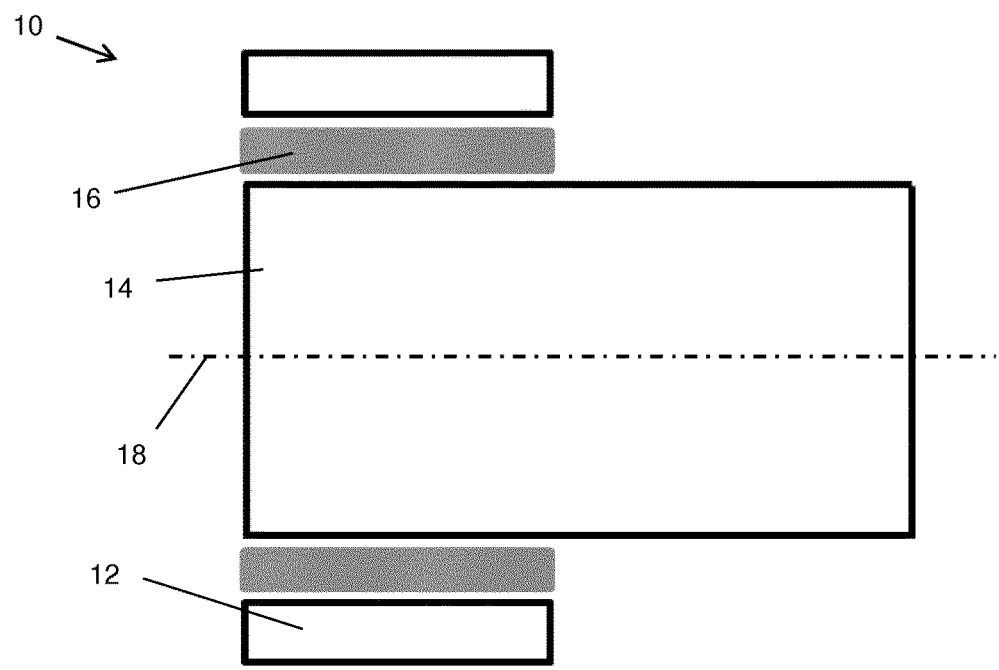
FIG. 2 is a schematic cross-sectional view of the magnetic gear in FIG. 1 taken parallel to the rotation axis.

With reference to FIGS. 1 and 2, a magnetic gear 10 according to an embodiment of the invention is illustrated. The magnetic gear 10 includes three generally tubular members separated by air gaps, and disposed in concentric relation: a stationary outer member, hereafter referred to as a stator 12; an inner rotatable member, hereafter referred to as an inner rotor 14; and an intermediate rotatable member, hereafter referred to as an intermediate rotor 16. The intermediate rotor 16 is disposed between the stator 12 and the inner rotor 14. The inner and intermediate rotors 14, 16 are arranged for independent rotation about a common axis 18.

As shown most clearly in FIG. 2, in this embodiment the front ends of the stator 12 and the inner and intermediate rotors 14, 16 (shown to the left in FIG. 2) are substantially coplanar. The stator 12 and the intermediate rotor 16 are approximately equal in length along the axis 18, whereas the inner rotor 14 extends beyond both the stator 12 and the intermediate rotor 16. Accordingly, the inner rotor 14 includes a portion that is not enclosed by either the stator 12 or the intermediate rotor 16.

The stator 12 has a set of electromagnets 20 disposed around its circumference. The electromagnets 20 are of equal size to one another, and are equidistantly spaced around the stator 12. The electromagnets 20 each comprise a coil of wire disposed around a soft iron magnetic core, such that magnetic poles are formed when the wire is energised. The orientation of the magnetic poles is dependent on the direction of the current flowing through the coil. To energise the electromagnets 20, a voltage may be applied, for example from a battery. In this embodiment, the coils of the electromagnets 20 are all connected together in series, and the alternating polarity is provided for by appropriate connection of the coils of the respective electromagnets 20. For example, a single length of wire may be used to form the coils of all of the electromagnets 20 with the coils of the neighbouring electromagnets 20 being wound in opposite senses.

A set of permanent magnets 22 is disposed around the circumference of the inner rotor 14. The permanent magnets 22 are all equally sized, and are evenly distributed around the inner rotor 14. Both the permanent magnets 22 and the electromagnets 20 are oriented such that the sources and sinks of magnetic flux are aligned perpendicular to the common axis 18, and with alternating polarity.

The intermediate rotor 16 includes a set of core members 24 which are equally sized and evenly distributed around the circumference of the intermediate rotor 16, separated by air gaps 25 or non-magnetic material. The core members 24 are made from a ferromagnetic material.

In use, the magnetic gear 10 creates a gear ratio between the inner and intermediate rotors 14, 16 using the same principle as found in known magnetic gearboxes. The electromagnets 20, when energised, generate a first magnetic field, and the permanent magnets 22 generate a second magnetic field. The first and second magnetic fields extend radially toward one another across the intermediate rotor 16. As the input shaft drives the intermediate rotor 16 to rotate about the axis 18, the core members 24 pass through the first and second magnetic fields. The core members 24 interact with the fields in such a way that rotation of the intermediate rotor 16 induces rotation of the inner rotor 14 by influencing the magnetic field produced by the electromagnets 20. The induced rotation of the inner rotor 14 differs from the speed of rotation of the intermediate rotor 16, so that a gear ratio is defined between the intermediate rotor 16 and the inner rotor 14.

In the illustrated embodiments, the core members 24 are arranged to modulate the first magnetic field, such that a modulated field is created in the air gap between the intermediate rotor 16 and the inner rotor 14. Since the core members 24 rotate, the spatial distribution of the modulated field is not fixed; the modulated field rotates at a speed which is governed by the relative sizes of the core members 24 and the electromagnets 20, along with the speed of rotation of the intermediate rotor 16 relative to the first magnetic field. In this embodiment, the modulated field has a different rotational speed than the intermediate rotor 16. The core members 24 are sized such that the spatial distribution of the modulated field matches the spatial distribution of the second magnetic field created by the permanent magnets 22. Said another way, the core members 24 modulate the first magnetic field to form a space harmonic of the second magnetic field.

The second magnetic field couples to the modulated field, such that the inner rotor 14 is rotated at the same speed as the modulated field. Accordingly, the inner rotor 14 is magnetically coupled to the intermediate rotor 16, so that torque is transferred between the intermediate rotor 16 and the inner rotor 14. The inner rotor 14 therefore rotates at a different speed to the intermediate rotor 16, such that the gear ratio is defined between the intermediate and inner rotors 14, 16. If the first magnetic field is unchanging, the magnitude of the gear ratio is fixed. In this case, if the intermediate rotor 16 is driven as an input and the inner rotor 14 is coupled with an output, the magnetic gear 10 provides a fixed speed increase between the input and the output.

As noted above, the modulated field rotates at a speed which is determined in part by the rotational speed of the intermediate rotor 16 relative to the first magnetic field. Therefore, for a given rotational speed of the intermediate rotor 16, the speed at which the modulated field moves may be varied by controlling the electromagnets 20 so as to rotate the first magnetic field. This can be achieved by operating the electromagnets 20, in a similar manner to those in a conventional electric motor. As noted above, the electromagnets 20 are wired in series, with the coils arranged such that when a current is applied the electromagnets 20 have alternating polarity. Therefore, each electromagnet 20 has an electromagnet 20 of opposite polarity on either side. The orientation of the polarity of the electromagnets 20 is determined by the direction of the current flowing through them. Therefore, an alternating current can be applied to the electromagnets 20 in order to alternate the direction of the polarity of each electromagnet 20.

As the polarity of each electromagnet 20 alternates, the overall first magnetic field created collectively by the set of electromagnets 20 effectively rotates in the same way as if the stator 12 were to be physically rotated. The rotational speed of the first magnetic field is determined by the frequency of the alternating current.

Since the inner rotor 14 rotates at the same speed as the modulated field, varying the rotational speed of the first magnetic field in this way causes the rotational speed of the inner rotor 14 relative to the intermediate rotor 16 to vary, and hence the gear ratio is variable. In this way, the electromagnets 20 are operable to control the gear ratio. Typically, the gear ratio is adjustable between around +/−50:1 and 1:1. Therefore, the output speed from the magnetic gear 10 can be de-coupled from the input speed through appropriate control of the gear ratio.

Figure 3:
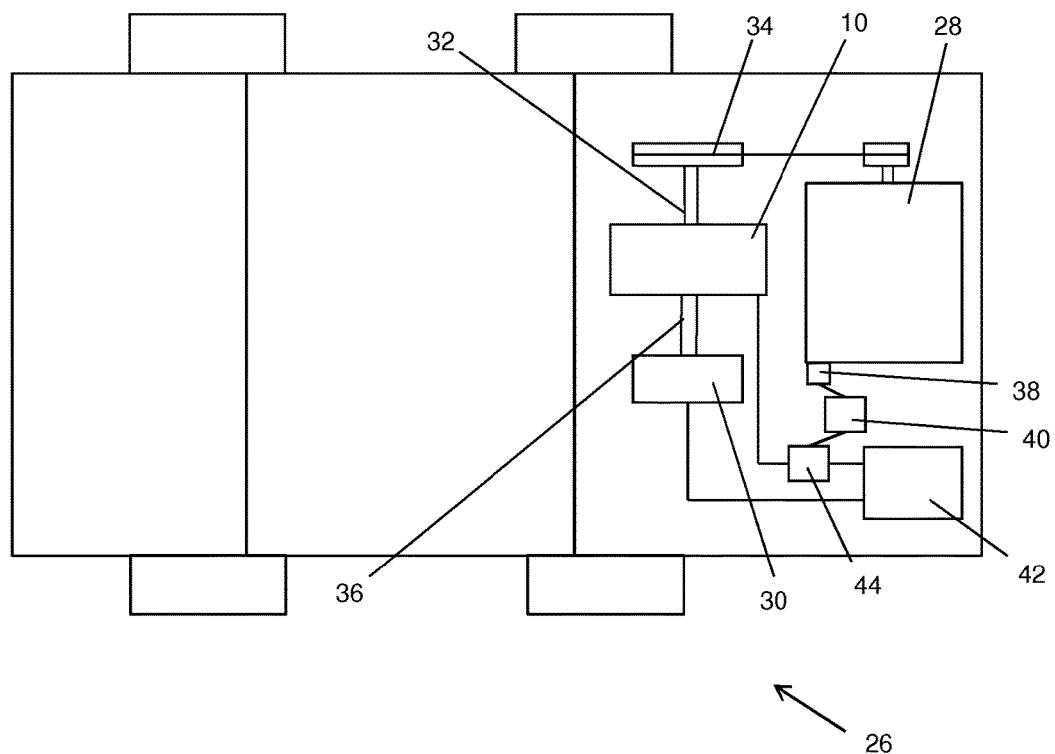
FIG. 3 is a schematic drawing of a vehicle including the magnetic gear in FIG. 1.

With reference now to FIG. 3, in another embodiment the magnetic gear 10 is used in a vehicle 26 to transmit drive from a vehicle engine 28 to a generator 30, also known as an alternator. In this embodiment, the intermediate rotor 16 of the magnetic gear 10 is coupled to a low speed input shaft 32 that is associated with a pulley 34 driven by the vehicle engine 28, and the inner rotor 14 is coupled to a high speed output shaft 36 that is arranged to drive an armature of the generator 30. The vehicle 26 is further provided with a sensor 38 configured to detect the speed of the engine 28, and an engine control unit (ECU) 40 arranged to process incoming data from the sensor 38, and further arranged to control the gear ratio of the magnetic gear 10 according to the detected engine speed. Additionally, a vehicle battery 42 is provided to supply power for all electrical systems of the vehicle 26, including the electromagnets 20 of the magnetic gear 10. A power inverter 44 is included for the purpose of converting the DC supplied by the battery 42 into AC for driving the electromagnets 20.

One example in which the embodiment of the invention illustrated in FIG. 3 is used envisages a magnetic gear 10 driven by the engine by way of a pulley 34 with a pulley ratio of 1:1, so that the intermediate rotor 16 of the magnetic gear 10 is driven at engine speed. Accordingly, when the vehicle engine idles at 1000 rpm, the pulley ratio provides an input speed of 1000 rpm to the magnetic gear 10. This speed is detected by the sensor 38, and the ECU 40 uses this data to determine that a gear ratio of 3:1 should be used, so as to provide an output speed of 3000 rpm for the generator 30. Therefore, the ECU 40 configures the magnetic gear 10 accordingly. When the engine speed is at a maximum of 9000 rpm, the pulley ratio creates an input speed of 9000 rpm to the magnetic gear 10. Therefore, ECU 40 determines that the magnetic gear 10 should select a gear ratio closer to 1:1 to reduce the speed of the output, and hence the drive speed of the generator 30.

In another example, the magnetic gear 10 is driven by the engine 28 by way of a pulley 34 with a drive ratio of 1:3, so that the intermediate rotor 16 is driven at one third of the engine speed. At an engine idle speed of 1000 rpm, the magnetic gear 10 is set to a 9:1 gear ratio to drive the generator 30 at 3000 rpm. At an engine speed of 9000 rpm, the magnetic gear 10 is set to a gear ratio of 1:1 to maintain 3000 rpm output.

In this example, the magnetic gear 10 can be switched between gear ratios, so as to provide an output speed within an acceptable range at all times. Therefore, the maximum generator 30 speed can be reduced, whilst ensuring that the speed is sufficient to maintain the required electrical generating capacity at all times.

Furthermore, in contrast to a simple mechanical gearbox, the magnetic gear 10 can provide a continuously variable gear ratio within its range, so as to maintain a constant output speed against a varying input speed if desired. Therefore, in another example, the output speed from the magnetic gear 10 is monitored, and the gear ratio is dynamically adjusted accordingly, such that the generator is driven at an appropriate speed such that its electrical output matches the vehicle demands at all times.

Accordingly, the magnetic gear 10 can control the output speed to remain within a desired, relatively narrow range against an engine driven input speed that varies over a much wider range. Therefore, when the engine 28 is idling, the gear ratio is adjusted such that the armature is driven at a sufficient speed to provide for the energy requirements of the vehicle 26. Correspondingly, when the engine speed is high, the gear ratio is lowered such that the armature is not driven at a higher speed than is necessary. The gear ratio can be continuously varied such that the generator speed is maintained at an optimum level with respect to operating efficiency.

Figure 4:
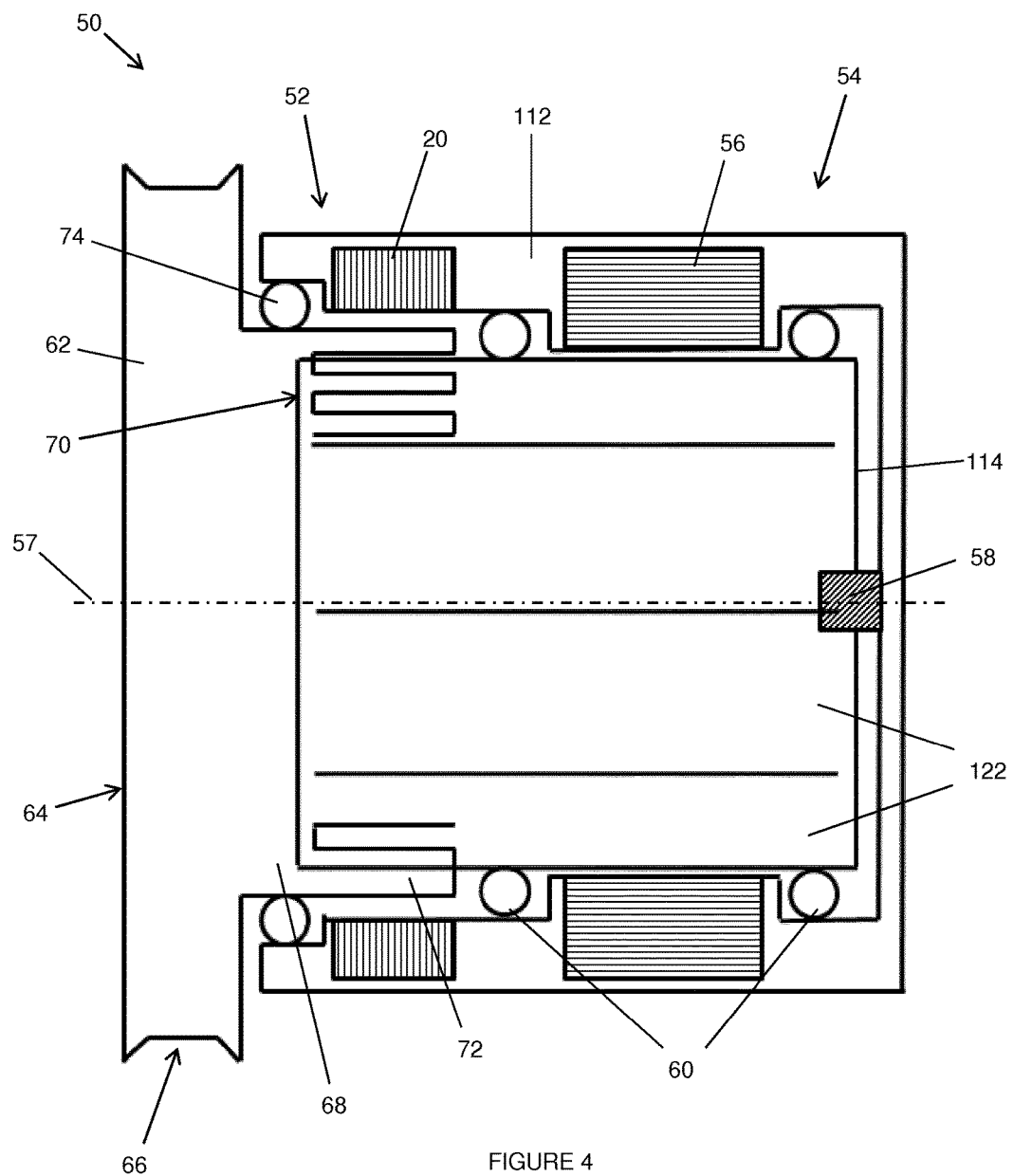
FIG. 4 is a schematic cross-sectional view of a generator arrangement according to another embodiment of the invention.

Turning now to FIG. 4, an integrated-gear generator arrangement 50 according to another embodiment of the invention is shown. In this embodiment, the integrated-gear generator 50 is suitable for use in a vehicle, although it will be understood that there are many potential applications for the arrangement 50.

The integrated-gear generator 50 includes a geared portion 52 and a generator portion 54. The geared portion 52 corresponds to the magnetic gear of the embodiment described with reference to FIGS. 1 and 2, while the generator portion 54 corresponds to a conventional vehicle generator or alternator.

In this arrangement 50, the stator of the magnetic gear is integrated with the stator of the generator in a common stator component 112. Accordingly, the stator component 112 includes a set of electromagnets 20 at an end located in the geared portion 52, and a set of generator windings 56 axially offset from the electromagnets 20 at an end located in the generator portion 54. As in the previous embodiment of FIGS. 1 and 2, in the FIG. 4 embodiment the electromagnets 20 are arranged so as to have alternating polarity when energised, with the sources and sinks of magnetic flux aligned perpendicular to a central axis 57.

An inner rotor 114 is journaled within the stator component 112, supported by a plurality of bearings 60. In this embodiment, the inner rotor 114 has a set of electromagnets known as rotor magnets 122 disposed around it. The rotor magnets 122 are energised by means of a set of brushes 58 which are attached to the stator component 112. Current is supplied to the brushes from a suitable power source. When energised, the rotor magnets 122 act in the same manner as the permanent magnets of the magnetic gear described above with reference to FIGS. 1 and 2. Accordingly, when energised, the rotor magnets 122 of FIG. 4 are arranged around the inner rotor 114 with alternating polarity, and extend parallel to the axis of rotation, along the entire length of the inner rotor 114. The rotor magnets 122 are oriented such that the sources and sinks of flux are aligned perpendicular to the central axis 57, which is also the axis of rotation of the inner rotor 114. The inner rotor 114 extends along the entire length of the stator component 112, such that the inner rotor 114 and the rotor magnets 122 are common to both the geared portion 52 and the generator portion 54 of the integrated-gear generator 50.

The section of the inner rotor 114 that is disposed within the geared portion 52 is driven magnetically in the same manner as the inner rotor 14 of the magnetic gear of FIGS. 1 and 2, as will be described below. The section of the inner rotor 114 that is located in the generator portion 54 is arranged to magnetically interact with the generator windings 56 of the stator component 112 in order to convert mechanical energy into electrical energy by electromagnetic induction.

An input member 62 of the integrated-gear generator 50 performs the function of the intermediate rotor of the embodiment illustrated in FIGS. 1 and 2. The input member 62 of the integrated-gear generator 50 includes a pulley section 64 having an annular groove 66 in which a drive belt is received. A generally cylindrical body 68 of reduced diameter extends axially away from an end face of the pulley section 64. A recess 70 is formed in the body 68, defining a tubular portion of the body 68 into which teeth 72 are formed in a castellated arrangement, such that the teeth 72 act as core members of the intermediate rotor. Accordingly, as with the core members of the previous embodiment, the input member 62 is made from a ferromagnetic material. The body 68 is rotatably received within the stator component 112, and is supported by a bearing 74. The free end of the inner rotor 114 is received in the recess 70, so that the teeth 72 are received in the gap between the electromagnets 20 and the inner rotor 114.

The stator component 112 is sized such that the generator windings 56 are as close as possible to the inner rotor 114, thereby maximising the induced current in the generator portion 54. A portion of the stator component 112 located in the geared portion 52 of the integrated-gear generator 50 has an enlarged inner diameter so as to accommodate the teeth 72 between the inner rotor 114 and the electromagnets 20. Additionally, further enlarged portions of the stator component 112 are provided in order to accommodate the bearings 60, 74.

Figure 5:
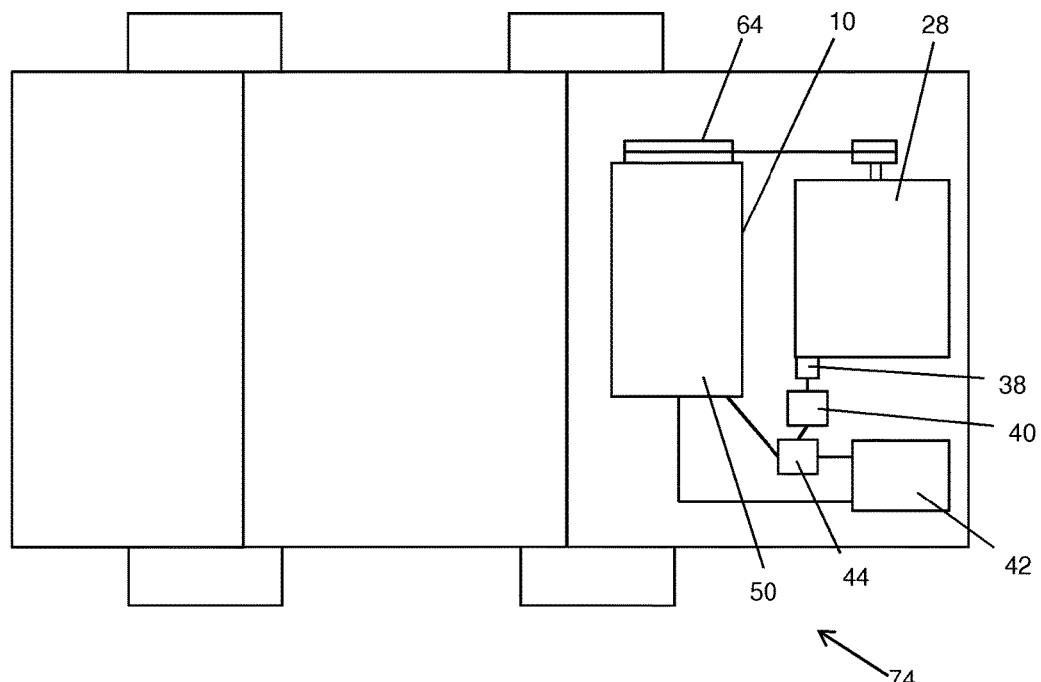
FIG. 5 is a schematic drawing of a vehicle including the generator arrangement of FIG. 4.

FIG. 5 illustrates a further embodiment of the invention, comprising a vehicle 74 including the integrated-gear generator 50 of FIG. 4. As in the embodiment shown in FIG. 3, the vehicle 74 in FIG. 5 includes an engine 28, an engine speed sensor 38, an ECU 40, a battery 42 and a power inverter 44, each of which performs the same function as in the embodiment of FIG. 3.

In the FIG. 5 embodiment, the pulley section 64 of the integrated-gear generator 50 is driven by a belt attached to the vehicle engine 28. This causes the teeth 72 of the input member 62 to rotate relative to the stator component 112. The electromagnets 20 are energised using a voltage supplied by the vehicle battery 42 which induces a current in each of the coils of the electromagnets 20. When energised, the electromagnets 20 create a first magnetic field. The rotor magnets 122 of the inner rotor 114 produce a second magnetic field. As in the FIG. 4 embodiment, in the embodiment shown in FIG. 5 the teeth 72 interact with the first and second magnetic fields such that rotation of the input member 62 induces rotation of the inner rotor 114 to define a gear ratio therebetween.

The power inverter 44 is controllable by the ECU 40 such that the AC frequency can be adjusted. The AC frequency determines the rotational speed of the first magnetic field, which in turn determines the gear ratio. In this way, the electromagnets 20 are operable to adjust the gear ratio as required.

As the inner rotor 114 rotates, the section of the inner rotor 114 located in the generator portion 54 acts as an armature of the generator. As the rotor magnets 122 turn, the movement of the second magnetic field induces an electrical current in the generator windings 56 in the same manner as in a conventional generator. The electrical current may then be used, for example, to charge the vehicle battery 42 and to power vehicle systems.

The magnitude and frequency of the induced current are dependent on the rotational speed of the inner rotor 114. Therefore, the instantaneous electrical requirements of the vehicle 74 define a desired rotational speed of the inner rotor 114. The speed at which the input member 62 rotates is directly proportional to the engine speed. Therefore, in order to ensure the inner rotor 114 rotates at a speed within a desired range, against a varying input speed, the electromagnets 20 are operated so as to control the gear ratio in the same manner as described above in relation to the magnetic gear of FIGS. 1 and 2. In the simplest arrangement, the electromagnets 20 are operated so as to provide an appropriate gear ratio to ensure that the rotational speed of the inner rotor 114 remains above a threshold at all times, the threshold corresponding to the minimum electrical requirements of the vehicle 74. In a more complex arrangement, the gear ratio is dynamically adjusted to substantially match the varying electrical demands of the vehicle 74 at all times.

As noted above, the frequency of the induced current is indicative of the rotational speed of the inner rotor 114. Therefore, closed loop control of the integrated-gear generator 50 is possible by detecting the frequency of the current induced in the generator windings 56, and using that information to determine an appropriate frequency to apply to the electromagnets 20 in order to adjust the gear ratio to provide an optimum rotational output speed of the inner rotor 114.

A second use for the integrated-gear generator 50 is envisaged, in which the arrangement acts as a DC to DC converter in a hybrid electric vehicle (HEV). Typically, HEVs use a high voltage battery having an output in the range of 100V to 200V to provide drive to the vehicle. In order to provide power for the internal electrical systems of the vehicle, a DC/DC converter must be provided in order to reduce the high voltage of the battery to the low voltage that such systems run on, typically 12V.

However, the low-voltage supply could alternatively be provided by the integrated-gear generator 50 of FIG. 4. The power output from the generator portion 54 of the integrated-gear generator 50 is dependent on the speed at which the inner rotor 114 is driven. As described previously, this speed can be controlled by selecting an appropriate gear ratio according to the input speed. Therefore, the integrated-gear generator can provide a 12V supply with the appropriate power to satisfy the requirements of the internal electrical systems of the vehicle through appropriate control of the gear ratio.

It is noted that the integrated-gear generator 50 can be used as a power inverter to provide a low-voltage supply from a high voltage battery when the vehicle engine is not running. When the vehicle engine is not running, the input member 62 is not driven, and therefore the teeth 52 are stationary. The electromagnets 20 can be operated so as to rotate the first magnetic field relative to the stationary teeth 52. This causes the inner rotor 114 to rotate with a fixed speed relative to the rotational speed of the first magnetic field, so as to induce a current in the generator windings 56. Accordingly, the rotational speed of the first magnetic field can be controlled so as to cause the inner rotor 114 to rotate at a speed corresponding to a 12V output with the required power.

Therefore, the integrated-gear generator 50 is able to provide for the electrical demands of the internal systems of the vehicle, which means that a DC/DC converter and, potentially, a low-voltage battery, are not required. Conventional DC/DC converters are typically expensive and difficult to package/cool, so the use of an integrated-gear generator of this embodiment of the invention in place of a conventional DC/DC converter provides a significant benefit.

Figure 6:
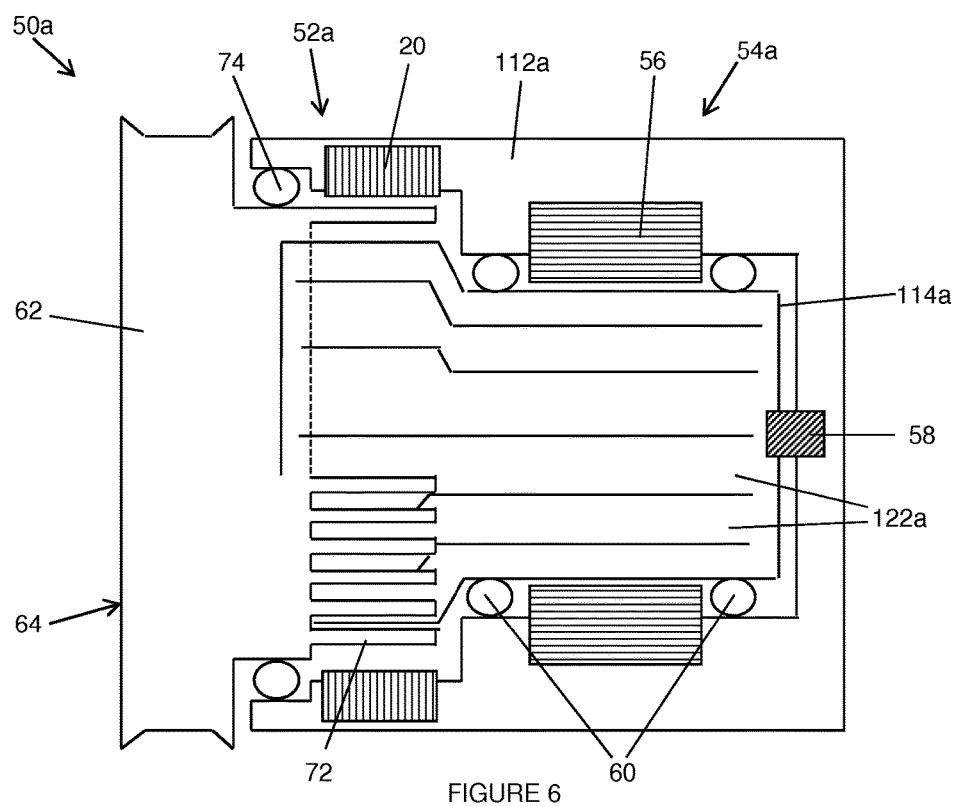
FIG. 6 is a schematic cross-sectional view of a generator arrangement according to another embodiment of the invention, taken parallel to the rotation axis of the arrangement.

FIG. 6 illustrates an integrated-gear generator arrangement 50*a* according to a further embodiment of the invention. The arrangement 50*a* is structurally similar to the embodiment depicted in FIGS. 4 and 5 and like components perform the same function as previously described. Therefore, for simplicity the description of FIG. 6 shall focus on features that are different to the corresponding features of the embodiment of FIGS. 4 and 5. To aid clarity, like reference numerals are used for like features.

As in other embodiments, in the integrated-gear generator 50*a* shown in FIG. 6 a common inner rotor 114*a* carrying a set of rotor magnets 122*a*, extends along the entire length of a common stator component 112*a*, supported by bearings 60. As in the embodiment of FIG. 4, the rotor magnets 122*a* are electromagnets that are energised by a set of brushes 58 attached to the stator. An input member 62 driven by a drive belt via an integrated pulley section 64 is disposed between the inner rotor 114*a* and the common stator component 112*a* in a geared portion 52*a* of the integrated gear generator 50*a*. A set of electromagnets 20 is disposed around the common stator component 112*a* in the geared portion 52*a*, and a set of generator windings 56 is disposed around the common stator component 112*a* at a location axially spaced from the electromagnets 20 to define a generator portion 54*a*.

As in previous embodiments, when the electromagnets 20 of the geared portion 52*a* are energised, a first magnetic field is created. A second magnetic field is produced when the rotor magnets 122*a* are energised. When the teeth 72 of the input member 62 rotate, interaction between the teeth 72 and the first magnetic field creates a modulated field that couples to the second magnetic field to induce rotation of the inner rotor 114*a*.

In this embodiment, the diameter of the inner rotor 114*a* varies along its axial length, such that a first portion of the inner rotor 114*a* disposed within the geared portion 52*a* has a larger diameter than a second portion of the inner rotor 114*a* disposed within the generator portion 54*a*. The first and second portions of the inner rotor 114*a* are joined by way of a tapered section.

The common stator component 112*a* is shaped such that the difference between the inner diameter in the geared portion 52*a* and the inner diameter in the generator portion 54*a* is larger than in the previously described arrangement 50, so as to accommodate the varying diameter of the inner rotor 114*a*.

A benefit of the arrangement 50*a* shown in FIG. 6 in which the inner rotor 114*a* is divided into two portions of different diameter is that it optimises the ability of the integrated-gear generator 50*a* to respond to low electrical demand.

In the event that demand for electrical power in the vehicle is low, only a small electrical current is required in the generator windings 56. This smaller electrical current can be achieved in two ways: through selection of a gear ratio that produces a low rotational speed of the inner rotor 114*a*, and/or by supplying a smaller current to the rotor magnets 122*a* of the inner rotor 114*a*.

The effect of reducing the current supplied to the rotor magnets 122*a* is to reduce the strength of the second magnetic field, resulting in the induction of a smaller current in the generator windings 56. However, reducing the current to the rotor magnets 122*a* also reduces the strength of the coupling between the modulated field and the second magnetic field in the geared portion 54*a*, reducing the torque acting to rotate the inner rotor 114*a*.

It is well known that induction of a current in the generator windings 56 will create a back torque, which in this case acts on the rotor magnets 122*a* to oppose rotation of the inner rotor 114*a*. This back torque must be overcome in the geared portion 52*a* in order for the inner rotor 114*a* to rotate. Increasing the diameter of the inner rotor 114*a* in the geared portion 52*a* relative to the generator portion 54*a* creates a mechanical advantage, in that it increases the moment arm on which the force exerted on the inner rotor 114*a* by the modulated field acts. Therefore, for a given magnetic field strength, increasing the radius of the inner rotor 114*a* increases the torque acting on the rotor magnets 122*a*. Varying the diameter of the inner rotor 114*a* thus aids rotation of the inner rotor 114*a* in the event that a small current is supplied to the rotor magnets 122*a*.

It is also noted that increasing the diameter of the inner rotor 114*a* in the geared portion 52*a* of the integrated-gear generator 50*a* raises its tangential speed at its outer surface for a given rotational speed relative to the portion of the inner rotor 114*a* in the generator portion 54*a*. This in turn elevates the tangential speed of the second magnetic field relative to the modulated field. Overall, this emulates the effect of a higher inner rotor speed, for a given input speed to the input member 62, in the geared portion 52*a*. This further improves the magnetic coupling between the second magnetic field and the modulated field, thereby aiding torque transfer between the input member 62 and the inner rotor 114*a*.

It is noted that the embodiment of FIG. 4 can be thought of as a special case of the embodiment shown in FIG. 6, in which the first and second portions of the inner rotor 114*a* are of the same diameter, for example to minimise manufacturing costs.

Figure 7:
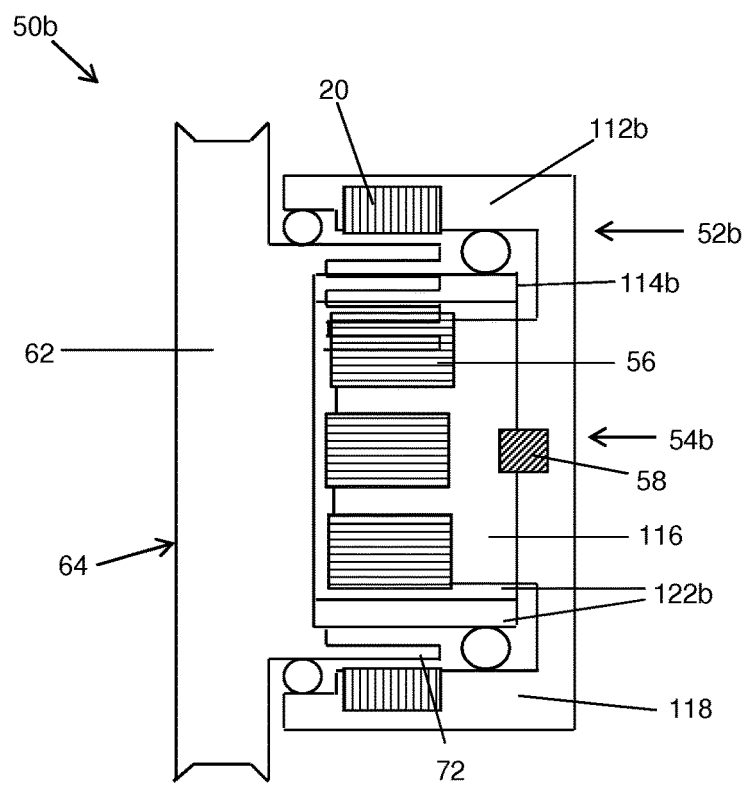
FIG. 7 is a schematic cross-sectional view of a generator arrangement according to a further embodiment of the invention, taken parallel to the rotation axis of the arrangement.
Figure 8:
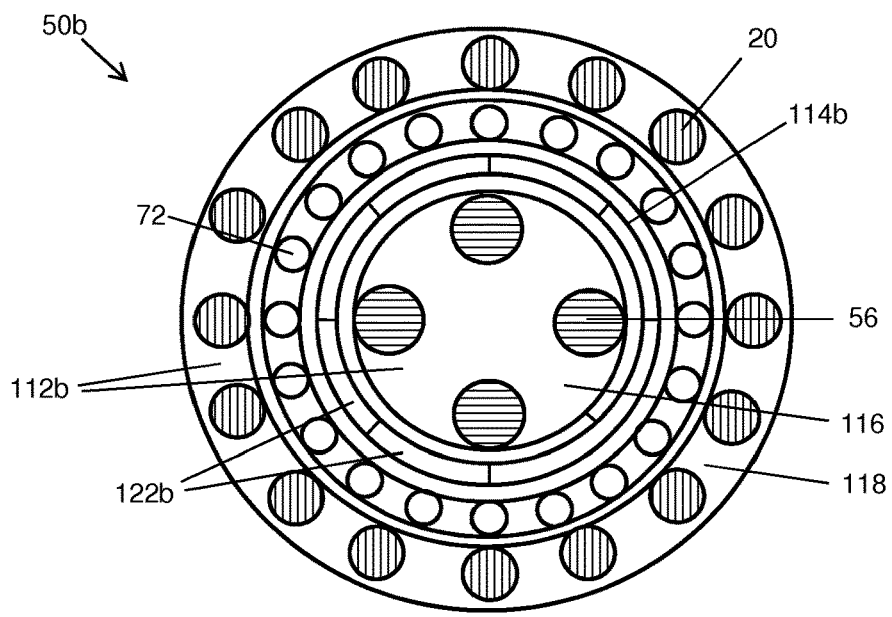
FIG. 8 is a schematic cross-sectional view of the generator arrangement in FIG. 7, taken normal to the rotation axis of the arrangement.

Referring to FIGS. 7 and 8, a further integrated-gear generator arrangement 50*b* is shown in which there is again a common stator component 112*b* to a geared portion 52*b* and a generator portion 54*b*. In this arrangement, however, the sections of the common stator component 112*b* relating to the geared portion 52*b* and the generator portion 54*b* are radially offset from one another in concentric relation, instead of being axially offset as in previous embodiments. This is achieved by way of a pair of concentric annular projections extending axially from a common side wall. Hereafter, the radially inner projection is referred to as a first stator section 116, and the radially outer projection is referred to as a second stator section 118. The first stator section 116 supports a set of generator windings 56, and the second stator section 118 carries a set of electromagnets 20.

An inner rotor 114*b* carrying a set of rotor magnets 122*b* is disposed between the first and second stator sections 116, 118, and an input member 62 driven by a drive belt via an integrated pulley section 64 is disposed between the inner rotor 114*b* and the second stator section 118 to define the geared portion 52*b* of the integrated gear generator 50*b*.

Ferromagnetic teeth 72 of the input member 62 are spaced apart from the external circumference of the inner rotor 114b, with the second stator section 118 arranged so as to be spaced from the external circumference of the input member 62. The generator windings 56 of the generator portion 54b, the inner rotor 114b, the input member 62 and the electromagnets 20 of the geared portion 52b are thus arranged in concentric relation, with the inner rotor 114b again forming a common rotor component to the magnetic gear and the generator.

As in previous embodiments, when the electromagnets 20 of the geared portion 52b are energised, a first magnetic field is created. A second magnetic field is produced by energising the inner rotor magnets 122b. When the teeth 72 of the input member 62 rotate, interaction between the teeth 72 and the first magnetic field creates a modulated field that couples to the second magnetic field to induce rotation of the inner rotor 114b.

In this embodiment, the second magnetic field extends radially both inwardly and outwardly from the rotor magnets 122b. An outwardly extending portion interacts with the modulated field to apply a turning moment to the inner rotor 114b which causes the inner rotor 114b to rotate. This in turn causes rotation of an inwardly extending portion of the second magnetic field, which induces an electrical current in the generator windings 56. As in the embodiment depicted in FIGS. 4 and 5, electromagnets 20 of the geared portion 52b are operated so as to control the gear ratio between the input member 62 and the inner rotor 114b, so as to obtain a desired rotational speed of the inner rotor 114b.

It is noted that the outwardly facing portion of the inner rotor 114b has a larger diameter than the inwardly facing portion of the inner rotor 114b. Therefore, in the same way as the embodiment of FIG. 6, the embodiment shown in FIGS. 7 and 8 has the ability to respond to low electrical demand by aiding torque transfer to the inner rotor 114b.

Many variations and modifications of the embodiments described above are possible. For example, in a variant of the magnetic gear illustrated in FIGS. 1 and 2, the stator and the inner and intermediate rotors of the magnetic gear may all be of equal length. Furthermore, the stator may not be tubular in shape; for example, the stator could have any shape, with a cylindrical bore provided which is suitable to receive the intermediate and inner rotors, with the electromagnets being distributed in a circular configuration around the bore.

The intermediate rotor of the magnetic gear of FIGS. 1 and 2 may be formed with integral core members, as opposed to the described arrangement in which separate core members are carried by the intermediate rotor. The core members may take the form of teeth in a castellated arrangement, in a similar manner to the input member of the integrated-gear generator.

The skilled reader will also appreciate that use of the magnetic gear of FIGS. 1 and 2 is not limited to transmission of power from an engine to a generator, or to use within a vehicle.

The magnetic gear of FIGS. 1 and 2 may be operated in reverse to act as a reduction gear. In this arrangement, the inner rotor may be coupled to an input, and the intermediate rotor coupled to an output, the output being rotated with a speed decrease relative to the input. In addition, the integrated-gear generator of FIG. 4 may be arranged to act as a reduction gear, so as to step down the speed of the inner rotor relative to the input, through appropriate selection of the ratio of electromagnets to permanent magnets.

The magnetic gear of FIGS. 1 and 2, as well as the integrated-gear generator of FIG. 4, may be arranged such that rather than connecting the electromagnets in series, the electromagnets are powered and controlled independently. In this scenario, the electromagnets may be operated individually, or alternatively the electromagnets may be selectively operated in pairs, triplets and so on. In this way, the ratio of electromagnets to permanent magnets may be varied, so as to vary the gear ratio.

In another variant, the electromagnets may be divided into groups, each group being powered independently. In the latter example, the groups may be powered according to a three-phase system.

Furthermore, the skilled reader will appreciate that there are several alternative methods for operating the electromagnets so as to rotate the first magnetic field. For example, in another embodiment the electromagnets are divided into two groups, the first group alternating with the second group. The first group is switched on, and the second group is switched off, and then this is reversed repeatedly, in the same manner as in a conventional stepper motor. In this embodiment, the permanent magnets may be arranged such that they all have the same polarity, with the spacing between the permanent magnets increased.

In another example, the magnetic gear of FIGS. 1 and 2 and the geared portion of the integrated-gear generator of FIG. 4 may be provided in a planar arrangement having coaxial rotating discs. In a further variant, a linear arrangement is also envisaged having a similar structure to conventional systems that will be familiar to the skilled reader.

In a variant of the generator of FIG. 4, an additional outer rotor including at least one set of permanent magnets may be provided between the stator and the teeth. In this arrangement, the first magnetic field is created by the permanent magnets of the outer rotor, such that relative movement of the teeth with respect to the outer rotor induces rotation of the inner rotor. The electromagnets are operable to rotate the outer rotor, so as to control the gear ratio. In a further variant, electromagnets are not provided on the stator, and instead an alternative means for rotating the outer rotor so as to control the gear ratio, for example an electric motor, is provided.

In another example, the magnetic gear of FIGS. 1 and 2 may be provided with a second set of electromagnets in the place of the permanent magnets on the inner rotor. The electromagnets on the inner rotor could be powered using brushes or slip-rings, in the same manner as in a conventional alternator. Correspondingly, the rotor magnets of the generator of FIG. 4 could be permanent magnets.

In a variant of the generator of FIG. 4, control of the gear ratio is implemented locally by means of a dedicated controller. The controller measures the speed of either the input shaft or the output shaft, and controls the gear ratio accordingly so as to meet the instantaneous vehicle electrical demands.

In the illustrated embodiments, the electromagnets of the generator are powered from the vehicle battery. In other embodiments, the electromagnets may be powered directly from the output from the generator windings. A separate, dedicated controller may be provided between the generator windings and the electromagnets so as to adjust the frequency of the current supplied to the electromagnets as required.

In a further variant of the generator of FIG. 4, the inner rotor may be coupled to an output shaft in order to drive an external device. In this variant, the generator acts as a normal variable speed magnetic gear, with a reduced part count compared with conventional gears, which may be used in any appropriate application.

It will be appreciated by a person skilled in the art that the invention could be modified to take many alternative forms to that described herein, without departing from the scope of the appended claims.

Further aspects of the present invention are set out in the following numbered paragraphs:

1. A magnetic gear comprising:
    a stationary member comprising a set of electromagnets;
    a first moveable member comprising a set of magnets; and
    a second moveable member disposed between the first moveable member and the stationary member, the second moveable member comprising a set of core members arranged to modulate a magnetic field generated by the set of electromagnets;
    wherein the first and second moveable members are magnetically coupled to define a gear ratio therebetween;
    and wherein the electromagnets are operable to influence the magnetic coupling between the first and second moveable members, thereby to control the gear ratio.
2. A magnetic gear according to paragraph 1, wherein the first moveable member couples to the modulated field, thereby to magnetically couple the first and second moveable members.
3. A magnetic gear according to paragraph 1, wherein the set of electromagnets is operable to rotate the magnetic field relative to the stationary member, so as to control the gear ratio.
4. A magnetic gear according to any paragraph 1, wherein the second moveable member is generally tubular.
5. A magnetic gear according to paragraph 4, wherein:
    the stationary member comprises a cylindrical bore in which the second moveable member is rotatably received;
    the first moveable member is rotatably received within the second moveable member;
    and the first and second moveable members are arranged concentrically with respect to the bore.
6. A magnetic gear according to paragraph 5, wherein the set of electromagnets is evenly distributed around the bore of the stationary member in a circular configuration.
7. A magnetic gear according to paragraph 5, wherein the set of magnets is evenly distributed around the first moveable member in a circular configuration.
8. A magnetic gear according to paragraph 5, wherein the core members are spaced from one another and are evenly distributed around the second moveable member in a circular configuration.
9. A magnetic gear according to paragraph 1, wherein the core members are formed integrally with the second moveable member in a castellated arrangement.
10. A magnetic gear according to paragraph 1, wherein the set of electromagnets is arranged such that, when energised, each electromagnet of the set has an opposite polarity to an adjacent electromagnet of the set.
11. A magnetic gear according to paragraph 1, wherein each electromagnet of the set is operable independently.
12. A magnetic gear system comprising a magnetic gear, the magnetic gear comprising:
    a stationary member comprising a set of electromagnets;
    a first moveable member comprising a set of magnets; and
    a second moveable member disposed between the first moveable member and the stationary member, the second moveable member comprising a set of core members arranged to modulate a magnetic field generated by the set of electromagnets;
    wherein the first and second moveable members are magnetically coupled to define a gear ratio therebetween;
    wherein the electromagnets are operable to influence the magnetic coupling between the first and second moveable members, thereby to control the gear ratio; and
    wherein the magnetic gear system comprises a controller arranged to control operation of the electromagnets.
13. A magnetic gear system according to paragraph 12, wherein the controller is arranged to provide an alternating current to the set of electromagnets such that the polarity of each electromagnet alternates, thereby to rotate the magnetic field relative to the stationary member at a speed determined by the frequency of the alternating current, thereby to control the gear ratio.
14. A magnetic gear system according to paragraph 13, wherein the controller comprises a power inverter for providing the alternating current, and wherein the power inverter is operable to control the frequency of the alternating current.
15. A magnetic gear system according to paragraph 12, wherein the second moveable member is coupled to an input shaft, and wherein the magnetic gear system comprises a sensor arranged to detect a rotational speed relating to the input shaft.
16. A magnetic gear system according to paragraph 15, wherein the first moveable member is coupled to an output shaft, and wherein the controller is arranged to control the gear ratio according to the detected speed such that the output shaft rotates at a speed within a predetermined range.
17. A generator comprising a magnetic gear, the magnetic gear comprising a stationary member comprising a set of electromagnets; a first moveable member comprising a set of magnets; and a second moveable member disposed between the first moveable member and the stationary member, the second moveable member comprising a set of core members; wherein:
    the first and second moveable members are magnetically coupled to define a gear ratio therebetween;
    the electromagnets are operable to control the gear ratio;
    the stationary member comprises a stator of the generator;
    the first moveable member comprises an armature of the generator, the armature being arranged to induce an electrical current in a set of generator windings disposed around the stator; and
    the second moveable member comprises an input arranged to receive a drive force.
18. A generator according to paragraph 17, wherein the core members are arranged to modulate a magnetic field generated by the set of electromagnets; and wherein the electromagnets are operable to influence the magnetic coupling between the first and second moveable members, thereby to control the gear ratio.
19. A generator according to paragraph 17, wherein at least one magnet of the first moveable member is arranged to cooperate with both the set of electromagnets and the set of generator windings.
20. A generator according to paragraph 17, wherein the input comprises a pulley which is integrated with the second moveable member.
21. A generator according to paragraph 17, wherein the stationary member comprises a cylindrical bore, and wherein a portion of the second moveable member including the core members is received in an end portion of the bore.
22. A generator according to paragraph 21, wherein the set of electromagnets and the set of generator windings are evenly distributed in a circular configuration around the bore, with the set of electromagnets disposed around the portion of the bore in which the core members are positioned, and the set of generator windings disposed around a portion of the bore which is not occupied by the core members.
23. A generator according to paragraph 22, wherein the second moveable member includes a recess which opens into the bore, and wherein an end portion of the first moveable member is rotatably received in the recess, such that the first and second moveable members are arranged concentrically with respect to the bore.
24. A generator system comprising a generator, the generator comprising:
a magnetic gear, the magnetic gear comprising a stationary member comprising a set of electromagnets;
a first moveable member comprising a set of magnets; and
a second moveable member disposed between the first moveable member and the stationary member, the second moveable member comprising a set of core members;
wherein:
the first and second moveable members are magnetically coupled to define a gear ratio therebetween;
the electromagnets are operable to control the gear ratio;
the stationary member comprises a stator of the generator;
the first moveable member comprises an armature of the generator, the armature being arranged to induce an electrical current in a set of generator windings disposed around the stator; and
the second moveable member comprises an input arranged to receive a drive force;
the generator system further comprising a controller arranged to control operation of the electromagnets.
25. A generator system according to paragraph 24, wherein the controller is arranged to provide an alternating current to the set of electromagnets such that the polarity of each electromagnet alternates, thereby to rotate the magnetic field relative to the stationary member at a speed determined by the frequency of the alternating current, thereby to control the gear ratio.
26. A generator system according to paragraph 25, wherein the controller comprises a power inverter for providing the alternating current, and wherein the power inverter is operable to control the frequency of the alternating current.
27. A generator system according to paragraph 24, comprising a sensor arranged to detect the rotational speed of at least one of the first and second moveable members, wherein the controller is arranged to control the gear ratio according to the detected speed of the first or second moveable member.
28. A vehicle comprising a magnetic gear system according to paragraph 12.
29. A vehicle comprising a magnetic gear system according to paragraph 14, wherein the output shaft is operably coupled to a vehicle generator, and the input shaft is operably coupled to a vehicle engine.
30. A vehicle comprising a generator according to paragraph 17.
31. A vehicle comprising a generator system according to paragraph 24.
32. A vehicle according to paragraph 30, wherein the input is driven by an engine of the vehicle.
33. A vehicle according to paragraph 31, wherein the input is driven by an engine of the vehicle
34. A method for operating a magnetic gear according to paragraph 1, comprising energising the set of electromagnets into a first state, so as to define an initial position for the magnetic field, and subsequently energising the set of electromagnets into a second state, so as to displace the magnetic field from its initial position.
35. A method according to paragraph 34, wherein the first state defines a respective initial polarity for each electromagnet, and in the second state the polarity of each electromagnet is opposite to its respective initial polarity.
36. A method according to paragraph 34, comprising energising the electromagnets such that each electromagnet alternates between the first and second states to define an alternation frequency.
37. A method according to paragraph 36, comprising adjusting the alternation frequency so as to adjust the gear ratio.
38. A method according to paragraph 36, comprising applying an alternating current to the electromagnets to alternate between the first and second states.
39. A method according to paragraph 35, comprising determining a rotational speed of an input to the gear, and controlling the gear ratio in accordance with the rotational speed of the input so as to provide a desired output speed.

The invention claimed is:

1. A generator comprising:
a magnetic gear, the magnetic gear comprising a stationary member comprising a set of electromagnets;
a first moveable member comprising a set of magnets; and
a second moveable member disposed between the first moveable member and the stationary member, the second moveable member comprising a set of core members, wherein:
the first and second moveable members are magnetically coupled to define a gear ratio therebetween;
the electromagnets are operable to control the gear ratio;
the stationary member comprises a stator of the generator;
the first moveable member comprises an armature of the generator, the armature being arranged to induce an electrical current in a set of generator windings disposed around the stator;
the second moveable member comprises an input arranged to receive a drive force; and
the stationary member is arranged such that said set of generator windings are axially offset from the electromagnets of the magnetic gear.
2. A generator according to claim 1, wherein the first movable member has a first portion and a second portion, the first portion and the second portion having different diameters.
3. A generator according to claim 2, wherein the first portion of the first movable member is axially aligned with said set of electromagnets of the magnetic gear and the first portion of the first moveable member is larger in diameter than the second portion of the first movable member.
4. A generator according to claim 1, wherein the stationary member is arranged such that said set of generator windings are radially offset from the electromagnets of the magnetic gear.
5. A generator according to claim 4, wherein said generator windings are disposed radially inward of the first movable member.

6. A generator according to claim 1, wherein at least one magnet of the first moveable member is arranged to cooperate with the set of electromagnets and the set of generator windings.

7. A generator according to claim 1, wherein the stationary member comprises a bore, and wherein a portion of the second moveable member including the core members is received in an end portion of the bore.

8. A generator according to claim 7, wherein said set of electromagnets and said set of generator windings are evenly distributed in a circular configuration around the bore, with the set of electromagnets disposed around the portion of the bore in which the core members are positioned, and with the set of generator windings disposed around a portion of the bore which is not occupied by the core members.

9. A generator according to claim 8, wherein the second moveable member includes a recess which opens into the bore, and wherein an end portion of the first moveable member is rotatably received in the recess, such that the first and second moveable members are arranged concentrically with respect to the bore.

10. A generator according to claim 1, comprising a control means arranged to control operation of the electromagnets.

11. A generator according to claim 10, wherein the control means is arranged to provide an alternating current to the set of electromagnets such that a polarity of each electromagnet alternates, to rotate the magnetic field relative to the stationary member at a speed determined by a frequency of the alternating current to control the gear ratio.

12. A generator according to claim 11, wherein the control means comprises a power inverter for providing the alternating current, and wherein the power inverter is operable to control the frequency of the alternating current.

13. A generator according to claim 10, comprising sensing means arranged to detect a rotational speed of at least one of the first and second moveable members, wherein the control means is arranged to control the gear ratio according to the detected speed of the first or second moveable member.

14. A vehicle comprising a generator according to claim 1.

15. A method for operating a generator comprising:
a magnetic gear, the magnetic gear comprising a stationary member comprising a set of electromagnets;
a first moveable member comprising a set of magnets; and
a second moveable member disposed between the first moveable member and the stationary member, the second moveable member comprising a set of core members, wherein:
the first and second moveable members are magnetically coupled to define a gear ratio therebetween;
the electromagnets are operable to control the gear ratio;
the stationary member comprises a stator of the generator;
the first moveable member comprises an armature of the generator, the armature being arranged to induce an electrical current in a set of generator windings disposed around the stator;
the second moveable member comprises an input arranged to receive a drive force;
the stationary member is arranged such that said set of generator windings are axially offset from the electromagnets of the magnetic gear; and
the method comprising energising said set of electromagnets into a first state, so as to define an initial position for a magnetic field, and subsequently energising the set of electromagnets into a second state, so as to displace the magnetic field from the initial position.

16. A method according to claim 15, wherein the first state defines a respective initial polarity for each electromagnet, and in the second state the polarity of each electromagnet is opposite to its respective initial polarity.

17. A method according to claim 15, comprising energising the electromagnets such that each electromagnet alternates between the first and second states to define an alternation frequency.

18. A method according to claim 17, comprising adjusting the alternation frequency so as to adjust the gear ratio.

19. A method according to claim 17, comprising applying an alternating current to the electromagnets to alternate between the first and second states.

20. A method according to claim 17, comprising determining a rotational speed of an input to the gear, and controlling the gear ratio in accordance with the rotational speed of the input so as to provide a desired output speed.

* * * * *